(12) United States Patent
Stretch et al.

(10) Patent No.: US 9,581,724 B2
(45) Date of Patent: Feb. 28, 2017

(54) METHOD FOR MAKING A COILED TUBING ASSEMBLY

(71) Applicant: Schlumberger Technology Corporation, Sugar Land, TX (US)

(72) Inventors: Mitchel Stretch, Calgary (CA); Nathan Kathol, Chestermere (CA); Vi Nguy, Shanghai (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 506 days.

(21) Appl. No.: 14/231,662

(22) Filed: Mar. 31, 2014

(65) Prior Publication Data

US 2014/0208570 A1    Jul. 31, 2014

Related U.S. Application Data (62) Division of application No. 12/711,811, filed on Feb. 24, 2010, now abandoned.

(60) Provisional application No. 61/246,815, filed on Sep. 29, 2009.

(51) Int. Cl.
*G01V 13/00* (2006.01)
*E21B 47/01* (2012.01)

(52) U.S. Cl.
CPC .............. *G01V 13/00* (2013.01); *E21B 47/01* (2013.01); *Y10T 29/49826* (2015.01)

(58) Field of Classification Search
CPC ......... G01V 13/00; E21B 47/01; E21B 47/06; E21B 47/065; H02G 1/08; H02G 1/088; H02G 1/081; H02G 3/28; H02G 3/38; F16L 2101/50; F16L 2101/70
See application file for complete search history.

(56) References Cited

U.S. PATENT DOCUMENTS

| | | | | |
|---|---|---|---|---|
| 2,339,671 A * | 1/1944 | Bergman | ................. | F16G 11/00 24/115 R |
| 3,898,011 A * | 8/1975 | Linquist | ................. | F16G 11/00 24/115 H |
| 4,101,114 A * | 7/1978 | Martin | ................... | H02G 1/081 254/134.3 FT |
| 4,368,910 A * | 1/1983 | Fidrych | .................... | D07B 1/18 24/115 N |
| 5,360,291 A * | 11/1994 | Shimizu | .................... | F16L 1/24 254/134.3 R |
| 6,116,085 A * | 9/2000 | Moffatt | ................. | E21B 17/206 166/250.01 |

(Continued)

*Primary Examiner* — Christopher M Koehler
(74) *Attorney, Agent, or Firm* — Michael L. Flynn (57) ABSTRACT

A coiled tubing assembly includes coiled tubing having a side wall that defines an opening and an insert covering the opening and affixed to the coiled tubing. The coiled tubing has a longitudinal axis. The insert defines a capillary window therethrough. The opening and the insert include ends that are non-perpendicular to the longitudinal axis. A method of making a coiled tubing assembly includes providing coiled tubing defining a side wall opening and pulling a capillary tube into the interior of the coiled tubing through the side wall opening. The method further includes attaching the capillary tube to a capillary window of an insert for covering the side wall opening and affixing the insert to the coiled tubing.

10 Claims, 10 Drawing Sheets

(56) References Cited

U.S. PATENT DOCUMENTS

| | | | |
|---|---|---|---|
| 2008/0202770 A1* | 8/2008 | Bolding | E21B 34/02 166/386 |
| 2010/0084620 A1* | 4/2010 | Thomas | H02G 1/08 254/134.3 R |
| 2011/0073210 A1 | 3/2011 | Stretch et al. | |
| 2014/0083716 A1* | 3/2014 | Frazier | E21B 34/10 166/376 |
| 2014/0230232 A1* | 8/2014 | Jaaskelainen | E21B 47/01 29/592.1 |

* cited by examiner

METHOD FOR MAKING A COILED TUBING ASSEMBLY

CROSS-REFERENCE TO RELATED APPLICATIONS

This application is a division of U.S. patent application Ser. No. 12/711,811 filed on Feb. 24, 2010 which claims priority from U.S. Provisional Application 61/246,815, filed on Sep. 29, 2009, which is incorporated herein by reference.

BACKGROUND OF THE INVENTION

Field of the Invention

The present invention relates to coiled tubing used in oilfield operations.

Description of Related Art

Information concerning, for example, the temperatures and pressures exhibited within a wellbore is used to predict the production interval of the well. Knowledge of the production interval is used to enhance the recovery rate of a well and, in turn, make the well more economical to operate. Tools exist to retrieve such information relating to conventional wells that exhibit temperatures below about 204° C. (400° F.). In wells that exhibit higher temperatures, such as steam assisted gravity drainage (SAGD) wells, cyclic steam wells, and the like, design of such tools becomes difficult, as elastomer materials often cannot withstand such high temperatures.

Other downhole devices have been constructed to measure characteristics, such as temperature and pressure, within a wellbore. For example, one such conventional device employs a coiled tubing in which a plurality of capillary tubes is disposed. Some of the plurality of capillary tubes have temperature sensors disposed therein, while others of the plurality of capillary tubes are used to measure pressure. In high temperature applications, however, such coiled tubing devices are susceptible to failure due to fatigue.

There are devices for measuring characteristics, such as pressure and temperature, in a downhole environment that are well known in the art, however, considerable shortcomings remain.

BRIEF SUMMARY OF THE INVENTION

In one aspect, the present invention provides a coiled tubing assembly. The coiled tubing assembly includes a coiled tubing having a side wall that defines an opening and an insert covering the opening and affixed to the coiled tubing. The coiled tubing has a longitudinal axis. The insert defines a capillary window therethrough. The opening and the insert include ends that are non-perpendicular to the longitudinal axis.

In another aspect, the present invention provides a method of making a coiled tubing assembly. The method includes providing a coiled tubing defining a side wall opening and pulling a capillary tube into an interior of the coiled tubing through the side wall opening. The method further includes attaching the capillary tube to a capillary window of an insert for covering the side wall opening and affixing the insert to the coiled tubing.

The present invention provides significant advantages, including increasing fatigue life of coiled tubing assemblies over conventional coiled tubing assemblies. Additional objectives, features and advantages will be apparent in the written description which follows.

BRIEF DESCRIPTION OF THE DRAWINGS

The novel features characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of this disclosure.

The present invention relates to a coiled tubing assembly comprising a coiled tubing having an opening in which an insert is affixed. The insert defines a capillary window in which a capillary tube is affixed. The capillary tube is used in the measurement of various downhole conditions, such as temperature, pressure, or the like.

Figure 1:
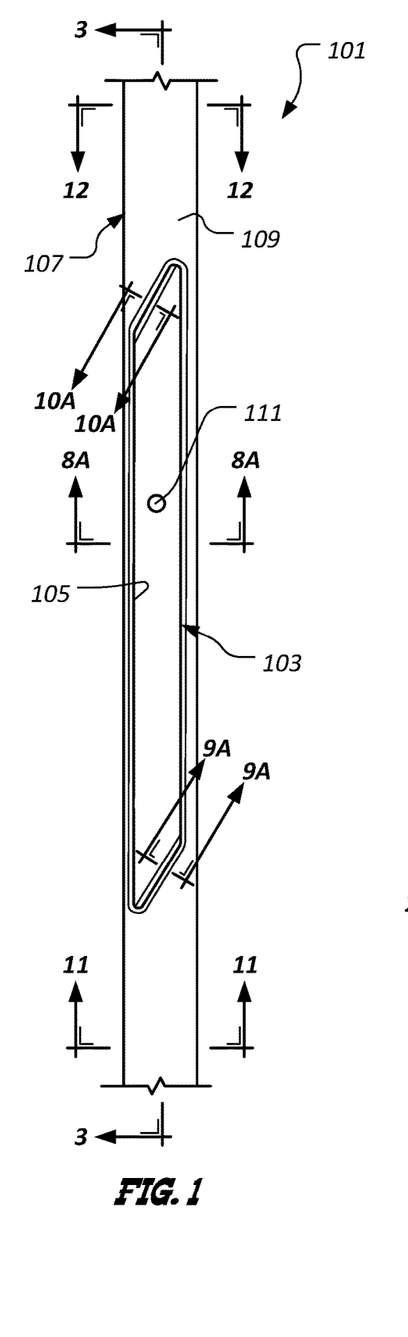
FIG. 1 is a top, plan view of an illustrative embodiment of a coiled tubing assembly.
Figure 2:
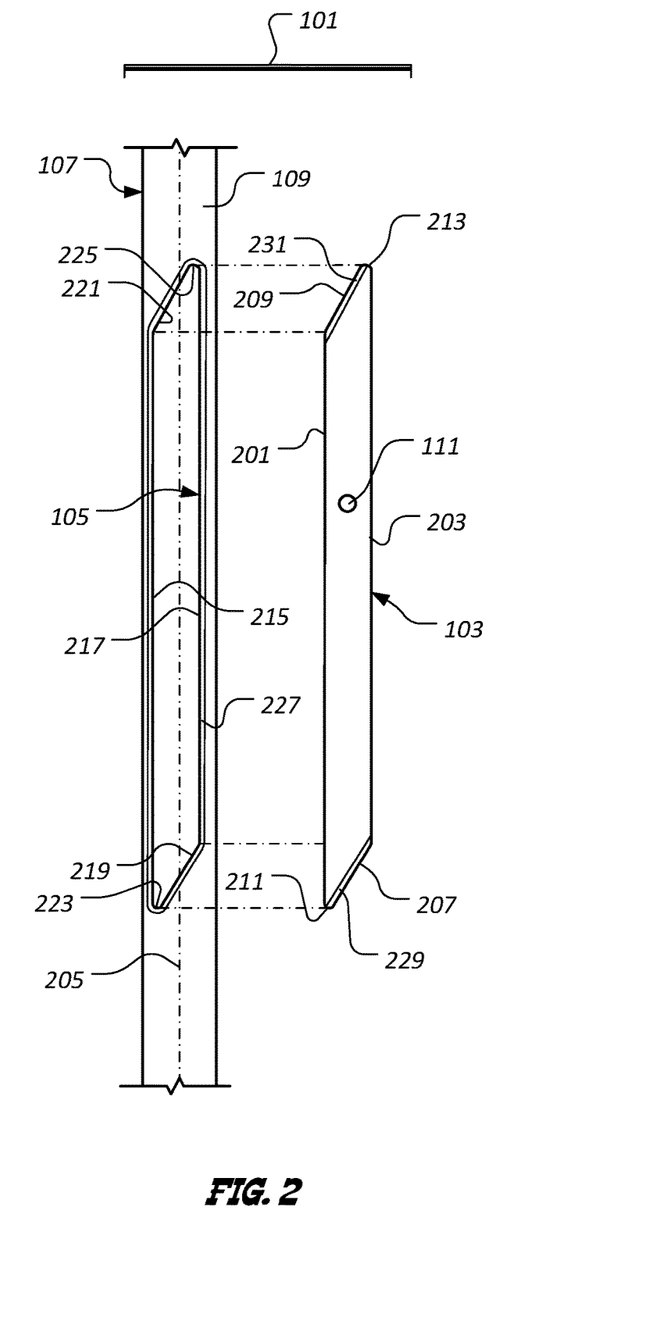
FIG. 2 is a top, plan view of the coiled tubing assembly of FIG. 1, wherein an insert of the coiled tubing assembly is displaced from an opening of a coiled tubing of the coiled tubing assembly.
Figure 3:
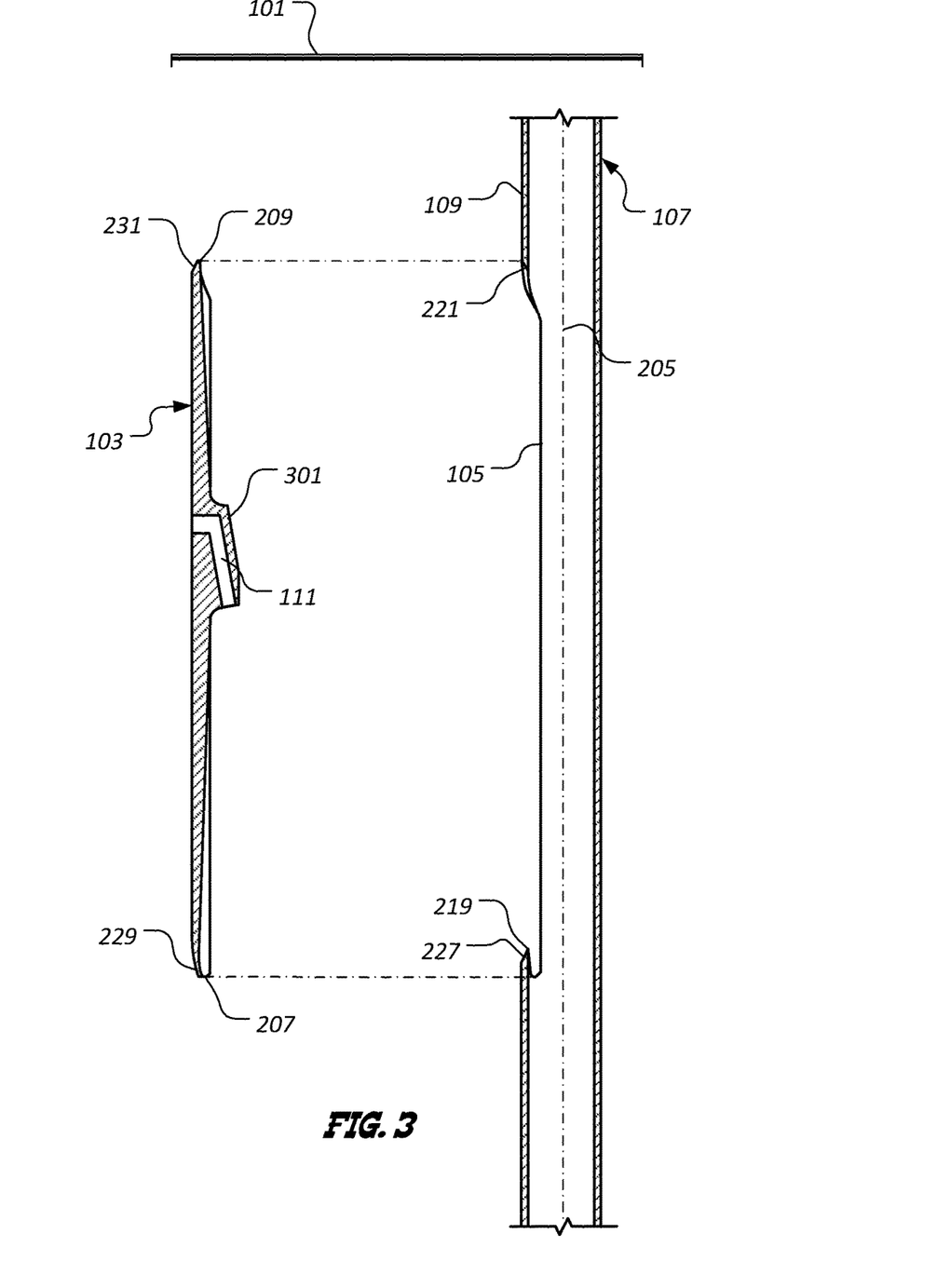
FIG. 3 is a cross-sectional view of the coiled tubing assembly of FIG. 1, taken along the line 3-3 in FIG. 1, wherein the insert of the coiled tubing assembly is displaced from the opening of the coiled tubing of the coiled tubing assembly.
Figures 11, 12, 13:
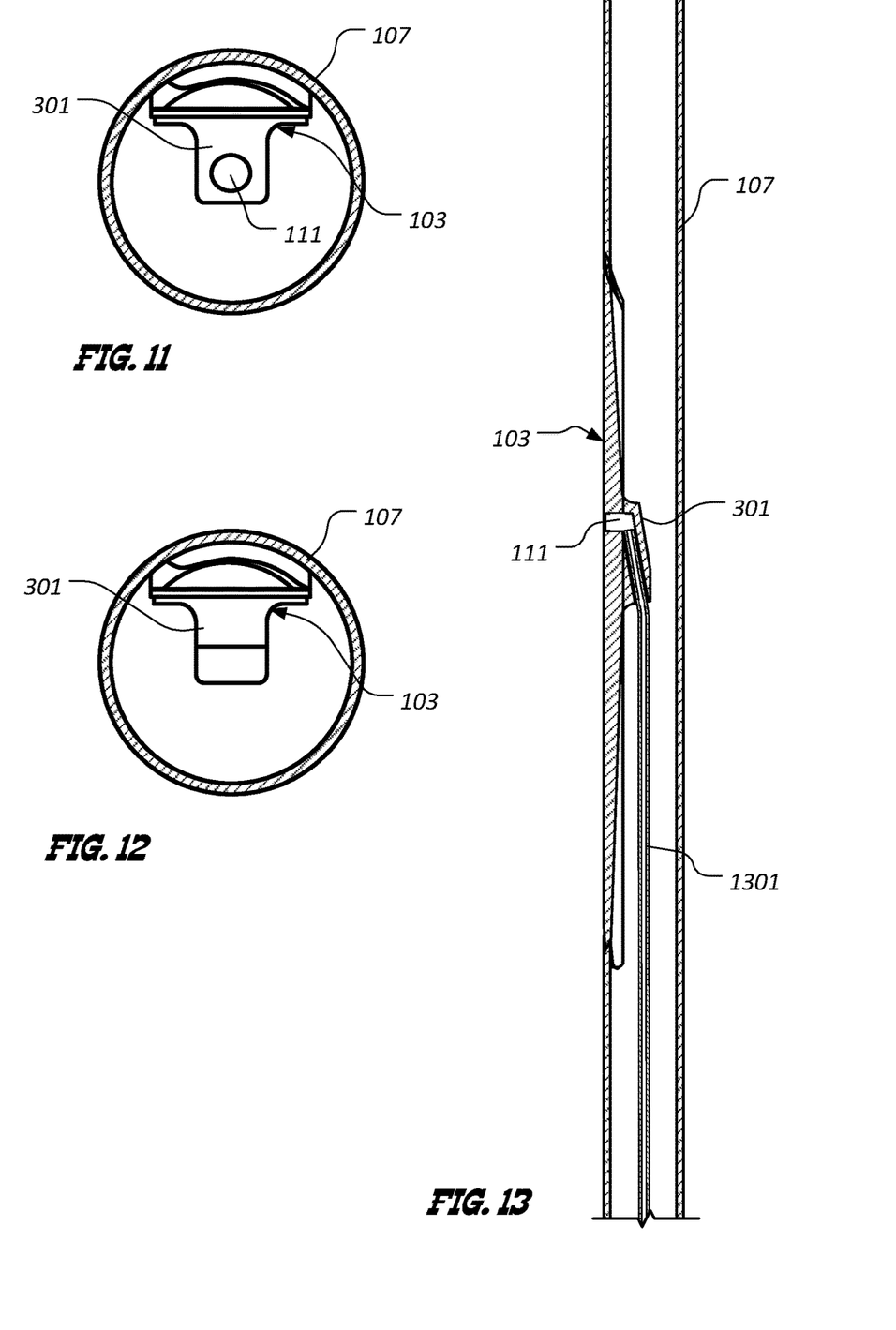
FIG. 11 is a cross-sectional view of the coiled tubing assembly of FIG. 1, taken along the line 11-11 in FIG. 1.
FIG. 12 is a cross-sectional view of the coiled tubing assembly of FIG. 1, taken along the line 12-12 in FIG. 1.
FIG. 13 is a cross-sectional view of an illustrative embodiment of an assembled coiled tubing assembly corresponding to the view of FIG. 3, except that the insert of the coiled tubing assembly is not displaced from the opening of the coiled tubing of the coiled tubing assembly.

FIGS. 1-3 depict various views of an illustrative embodiment of a coiled tubing assembly 101 configured to be operatively associated with a capillary tube, such as a capillary tube 1301 shown in FIG. 13, and associated devices for measuring conditions, such as temperature, pressure, and the like, that exist downhole in oilfield operations. FIG. 1 depicts a top, plan view of coiled tubing assembly 101. FIG. 2 depicts a top, plan view of coiled tubing assembly 101, in which an insert 103 is displaced from an opening 105 in a coiled tubing 107. FIG. 3 is a cross-sectional view, taken along the line 3-3 in FIG. 1, in which insert 103 is displaced from opening 105 in coiled tubing 107.

In the embodiment illustrated in FIGS. 1-3, coiled tubing assembly 101 comprises coiled tubing 107 defining opening 105 in a side wall 109 thereof. Coiled tubing assembly 101 further comprises insert 103 affixed in opening 105, such as by a weldment or the like, to isolate an interior of coiled tubing 107 from an environment about coiled tubing 107. Opening 105 and insert 103 incorporate particular features that inhibit fatigue-related failure of such coiled tubing assemblies, as are discussed in greater detail herein.

Figures 4, 5:
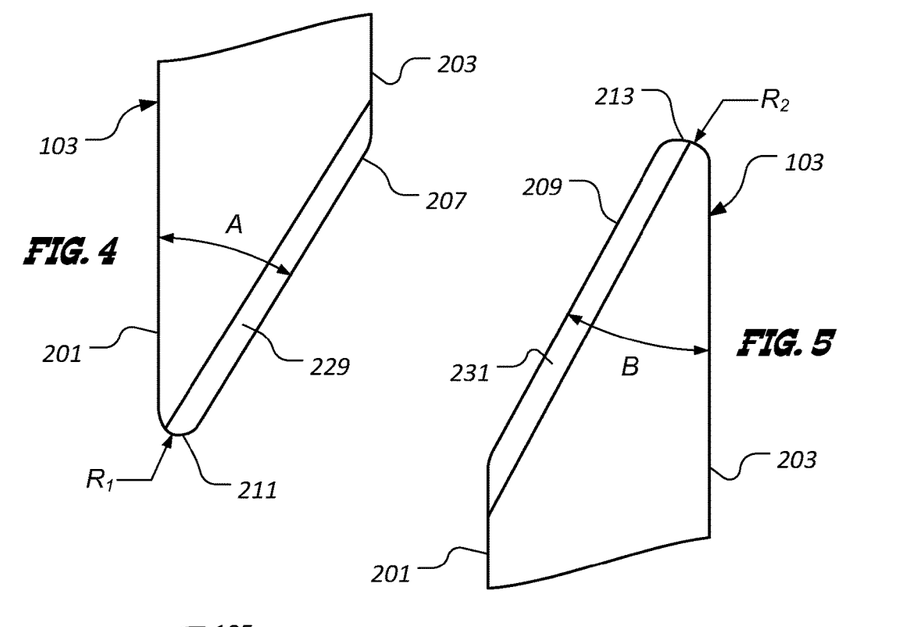
FIG. 4 is an enlarged view of a portion of the insert of the coiled tubing assembly of FIG. 1 including a first end thereof.
FIG. 5 is an enlarged view of a portion of the insert of the coiled tubing assembly of FIG. 1 including a second end thereof.

Referring in particular to FIG. 2, insert 103 includes a first side 201 and a second side 203 that extend generally parallel to a longitudinal axis 205 of coiled tubing 107. Insert 103 further includes a first end 207 and a second end 209 that are angled at non-right angles with respect to first side 201 and second side 203. FIG. 4 is an enlarged, top, plan view of first end 207 of insert 103 and FIG. 5 is an enlarged, top, plan view of second end 209 of insert 103. As best shown in FIGS. 4 and 5, respectively, first end 207 is angled with respect to first side 201 and second side 203 by an angle A, while second end 209 is angled with respect to first side 201 and second side 203 by an angle B. It should be noted that angle A may be the same as or different from angle B. In the illustrated embodiment, angles A and B are generally about 30 degrees, although the present invention contemplates many other angles A and B. For example, in various embodiments of the present invention, angles A and B may be within a range of about 15 degrees to about 70 degrees; however, the scope of the present invention is not so limited. First end 207 meets first side 201 at a first transition 211 and second end 209 meets second side 203 at a second transition 213. First transition 211 defines a radius $R_1$ and second transition 213 defines a radius $R_2$. Note that radius $R_1$ may be the same as or different from radius $R_2$. In the illustrated embodiment, radius $R_1$ and radius $R_2$ are greater than about 3 millimeters. It should be noted that radius $R_1$ and radius $R_2$ are preferably not so large as to cause angles A and B, respectively, to be outside of the range of about 15 degrees to about 70 degrees.

Figure 6:
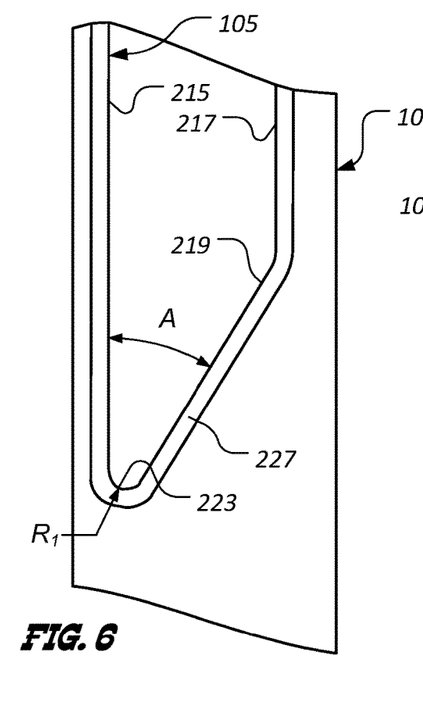
FIG. 6 is an enlarged view of a portion of the coiled tubing of the coiled tubing assembly of FIG. 1 including a first end of the opening in the coiled tubing.
Figure 7:
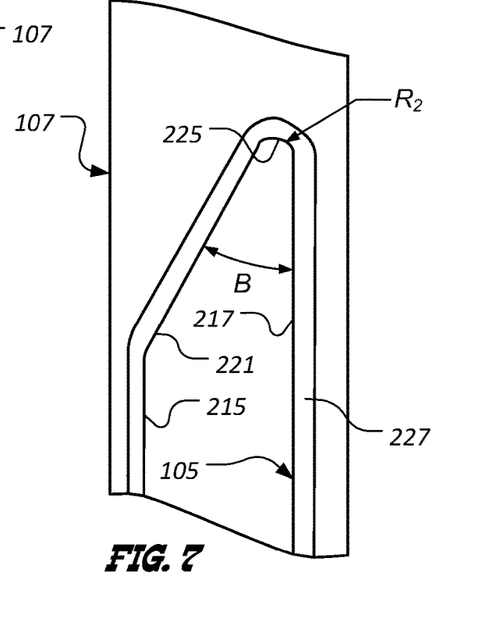
FIG. 7 is an enlarged view of a portion of the coiled tubing of the coiled tubing assembly of FIG. 1 including a second end of the opening in the coiled tubing.

Referring again to FIG. 2, opening 105 defined by coiled tubing 107 comprises a first side 215 and a second side 217 that extend generally parallel to longitudinal axis 205 of coiled tubing 107. As best shown in FIG. 6, which is an enlarged, top, plan view of a portion of opening 105, opening 105 further includes a first end 219 that is angled at angle A with respect to first side 215, i.e., generally corresponding to angle A of insert 103. Referring to FIG. 7, which is an enlarged, top plan view of a portion of opening 105, opening 105 further includes a second end 221 that is angled at angle B with respect to second side 217, i.e., generally corresponding to angle B of insert 103. First end 219 meets first side 215 at a first transition 223 and second end 221 meets second side 217 at a second transition 225. First transition 223 of opening 105 exhibits generally the same radius $R_1$ as first transition 211 of insert 103. Second transition 225 of opening 105 exhibits generally the same radius $R_2$ as second transition 213 of insert 103.

Figures 8A, 8B, 9A:
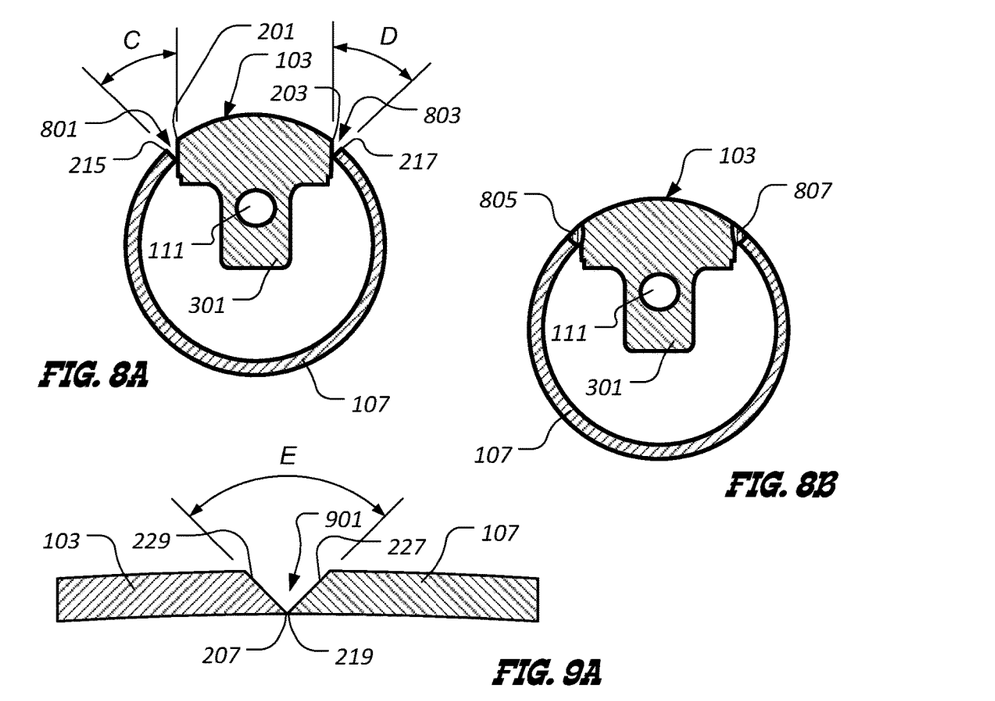
FIG. 8A is a cross-sectional view of the coiled tubing assembly of FIG. 1, taken along the line 8A-8A in FIG. 1, depicting an illustrative configuration of the coiled tubing assembly prior to welding.
FIG. 8B is a cross-sectional view of the coiled tubing assembly of FIG. 1, corresponding to the view of FIG. 8A, depicting an illustrative configuration of the coiled tubing assembly after welding.
FIG. 9A is a cross-sectional view of the coiled tubing assembly of FIG. 1, taken along the line 9A-9A in FIG. 1, depicting an illustrative configuration of the coiled tubing assembly prior to welding.

Referring again to FIG. 2, coiled tubing 107 defines a chamfer 227 about opening 105. Insert 103 defines a chamfer 229 along first end 207 of insert 103. Insert 103 further defines a chamfer 231 along second end 209 of insert 103. When insert 103 is mated with coiled tubing 107 in opening 105, as shown in FIG. 1, chamfers 227, 229, and 231 form joints between insert 103 and coiled tubing 107 where insert 103 is welded and joined to coiled tubing 107. For example, as shown in FIG. 8A, which is a cross-sectional view taken along the line 8A-8A in FIG. 1, a joint 801 extends along and between first sides 201 and 215 and exhibits an included angle C. A joint 803 extends along and between second sides 203 and 217 and exhibits an included angle D. It should be noted that angle C may correspond to or be different than angle D. Preferably, angles C and D are at least 45 degrees, to allow full weld penetration. As shown in FIG. 8B, which is a view corresponding to that of FIG. 8A, insert 103 is joined to coiled tubing 107 by weldments 805 and 807 where joints 801 and 803, respectively, existed prior to weldments 805 and 807 being generated.

Figures 9B, 10A:
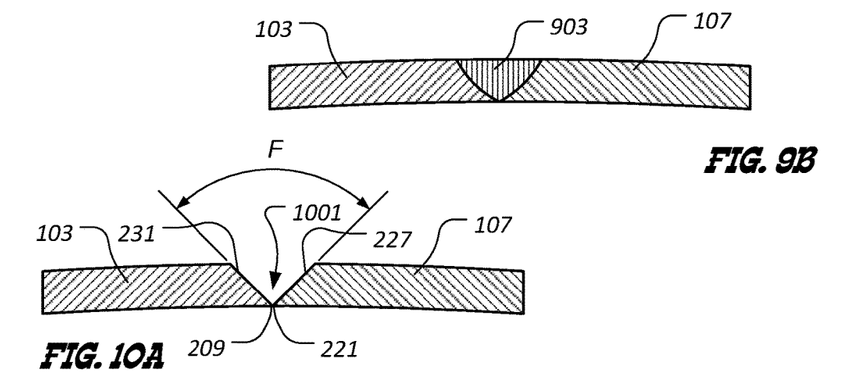
FIG. 9B is a cross-sectional view of the coiled tubing assembly of FIG. 1, corresponding to the view of FIG. 9A, depicting an illustrative configuration of the coiled tubing assembly after welding.
FIG. 10A is a cross-sectional view of the coiled tubing assembly of FIG. 1, taken along the line 10A-10A in FIG. 1, depicting an illustrative configuration of the coiled tubing assembly prior to welding.
Figure 10B:
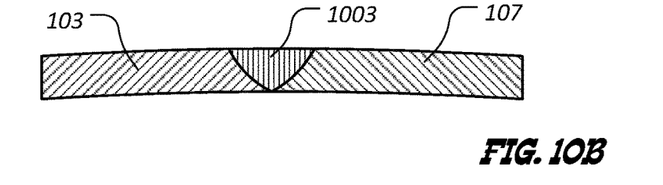
FIG. 10B is a cross-sectional view of the coiled tubing assembly of FIG. 1, corresponding to the view of FIG. 10A, depicting an illustrative configuration of the coiled tubing assembly after welding.

Similarly, as shown in FIG. 9A, which is a cross-sectional view taken along the line 9A-9A in FIG. 1, a joint 901 extends along and between first end 207 of insert 103 and first end 219 of opening 105 and exhibits an included angle E. Similarly, joint 1001 extends along and between second end 209 of insert 103 and second end 221 of opening 105 and exhibits an included angle F, as shown in FIG. 10A, which is a cross-sectional view taken along the line 10A-10A in FIG. 1. Note that angle E may correspond to or be different than angle F. Preferably, angles E and F are about 90 degrees to allow full weld penetration and to inhibit fatigue-related failure of coiled tubing assembly 101. As shown in FIG. 9B, which is a view corresponding to FIG. 9A, insert 103 is joined to coiled tubing 107 by weldment 903 where joint 901 existed prior to weldment 903 being generated. As shown in FIG. 10B, which is a view corresponding to FIG. 10A, insert 103 is joined to coiled tubing 107 by weldment 1003 where joint 1001 existed prior to weldment 1003 being generated.

FIG. 11 is a cross-sectional view taken along the line 11-11 in FIG. 1, while FIG. 12 is a cross-sectional view taken along the line 12-12 in FIG. 1. Referring in particular to FIGS. 3, 11, and 12, insert 103 includes a fitting 301 that defines a capillary window 111 (shown only in FIGS. 3 and 11) communicating between an interior of coiled tubing assembly 101 and an environment external to coiled tubing assembly 101. Fitting 301 and capillary window 111 are also shown in FIGS. 8A and 8B. As shown in FIG. 13, capillary tube 1301 is received in capillary window 111 such that an environment external to coiled tubing assembly 101 is communicated via capillary window 111 to capillary tube 1301. Capillary tube 1301 is used in the measurement of various characteristics of the environment external to coiled tubing assembly 101, such as temperature, pressure, or the like. For example, capillary tube 1301 may convey pressure, corresponding to the pressure of the environment external to coiled tubing assembly 101, to a pressure sensor that may be located inside coiled tubing 107 or proximate a wellhead at a surface of a well. Capillary window 111 may be configured to allow a pressure test fixture, a screen, a burst plug, or the like to be fitted to capillary window 111.

As discussed herein, opening 105 of coiled tubing 107 and insert 103 incorporate particular features that inhibit fatigue-related failure of such coiled tubing assemblies. Generally, fatigue cracks tend to propagate radially in coiled tubing, i.e., generally circumferentially about the coiled tubing perpendicular to a longitudinal axis of the coiled tubing, such as longitudinal axis 205 of coiled tubing 107. Weldments reduce fatigue life and tend to fail along heat affected zones adjacent weldments where the material of the coiled tubing is more brittle. Thus, axial weldments, i.e., weldments that are generally parallel to a longitudinal axis of the coiled tubing, such as longitudinal axis 205 of coiled tubing 107, perform better than radial weldments. As shown in at least FIG. 2, ends 207 and 209 of insert 103 and ends 219 and 221 of opening 105 are configured to be non-perpendicular to longitudinal axis 205 of coiled tubing 107, so that the heat affected zones adjacent weldments 903 (shown in FIG. 9B) and 1003 (shown in FIG. 10B) are not aligned with a plane of crack propagation. Such configurations inhibit the likelihood of crack initiation and propagation in coiled tubing assembly 101 and increase the fatigue life of coiled tubing assembly 101. Moreover, referring to FIG. 3, insert 103 tapers from greater thicknesses proximate fitting 301 to thinner thicknesses proximate first end 207 and second end 209. Fitting 301 is also preferably thinner, rather than thicker. These features allow fitting 301 to be more flexible and to reduce the amount of heat needed to generate weldments 805 and 807 (shown in FIG. 8B) proximate fitting 301.

Figure 14:
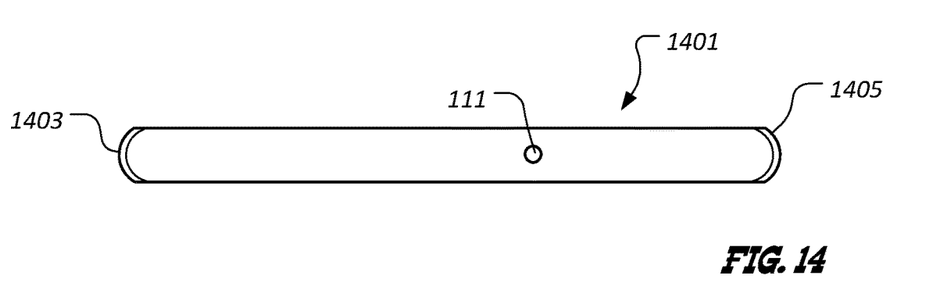
FIGS. 14 and 15 are top, plan views of alternative, illustrative embodiments of the insert of the coiled tubing assembly of FIG. 1.
Figure 15:
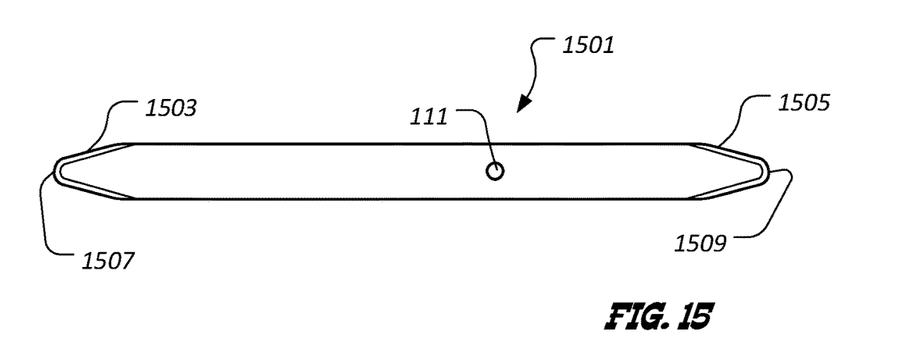

It should be noted that the present invention is not limited to the particular shape of insert 103 depicted in the drawings. For example, an insert for the present coiled tubing assembly may exhibit shapes such as those depicted in FIGS. 14 and 15. In the embodiment of FIG. 14, an insert 1401 includes a first end 1403 and a second end 1405 that exhibit semi-circular shapes. In the embodiment of FIG. 15, an insert 1501 includes a first end 1503 and a second end 1505 that exhibit angular shapes having central apexes 1507 and 1509, respectively. Generally, other aspects of inserts 1401 and 1501 correspond to the aspects of insert 103, shown in at least FIG. 1. Irrespective of the particular shape of the insert, the opening defined by the coiled tubing, e.g., opening 105 of coiled tubing 107, exhibits the same general shape as the insert used with the coiled tubing to make up the coiled tubing assembly. It should be noted that the present invention contemplates various shapes for insert 103 and opening 105 of coiled tubing 107 other than the shapes shown in the figures.

Coiled tubing assembly 101 may include one insert and corresponding capillary tube, such as insert 103 and capillary tube 1301, or coiled tubing assembly 101 may include many inserts and corresponding capillary tubes. While there are many ways to assemble coiled tubing assembly 101, FIGS. 16-25 depict one particular method of assembling coiled tubing assembly 101 and associated devices used in the method. It should be noted that, while the description herein relates to coiled tubing assembly 101 including insert 103, the description applies equally to any insert contemplated by the present invention.

Figure 16:
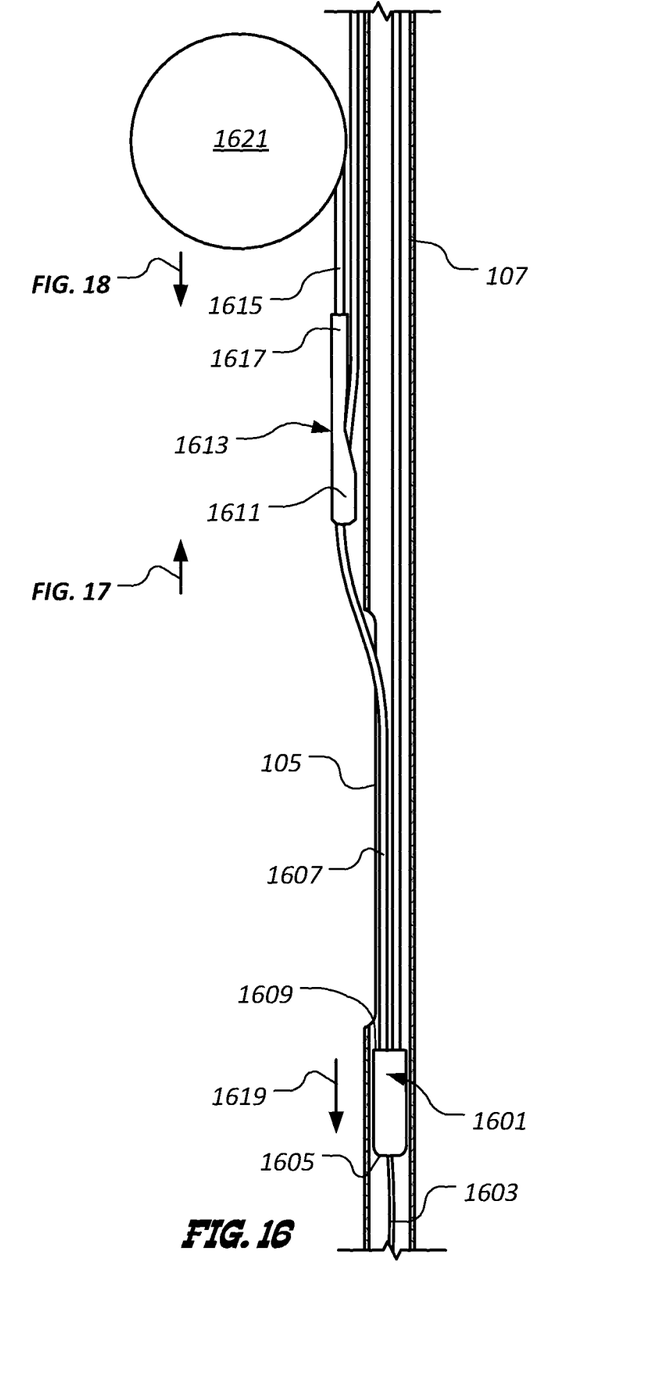
FIG. 16 is a cross-sectional view, corresponding to the view of FIG. 3, illustrating a method for assembling the coiled tubing assembly of FIG. 1 and depicting devices useful in the practice of the method.

Referring to FIG. 16, coiled tubing 107 is provided with opening 105. A primary pulling tool 1601 with a first pulling cable 1603 attached to a fore end 1605 thereof is disposed within coiled tubing 107. A second pulling cable 1607 is attached to an aft end 1609 of primary pulling tool 1601 and is attached through a first clip 1611 of a secondary pulling tool 1613. A capillary tube 1615, which corresponds to capillary tube 1301, is attached to a second clip 1617 of secondary pulling tool 1613. As primary pulling tool 1601 is advanced through coiled tubing 107, generally in a direction corresponding to arrow 1619, capillary tube 1615 is pulled into coiled tubing 107 from a spool 1621. At the next opening of coiled tubing 107, another secondary pulling tool 1613 is attached to second pulling cable 1607 via first clip 1611 thereof, so that another capillary tube may be pulled into coiled tubing 107.

Figure 17:
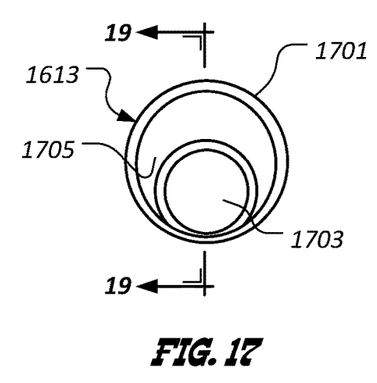
FIGS. 17 and 18 are end, elevational views of an illustrative embodiment of a secondary pulling tool of FIG. 16.
Figure 18:
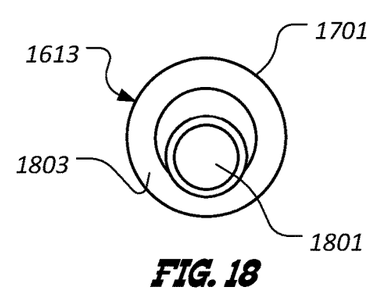
Figure 19:
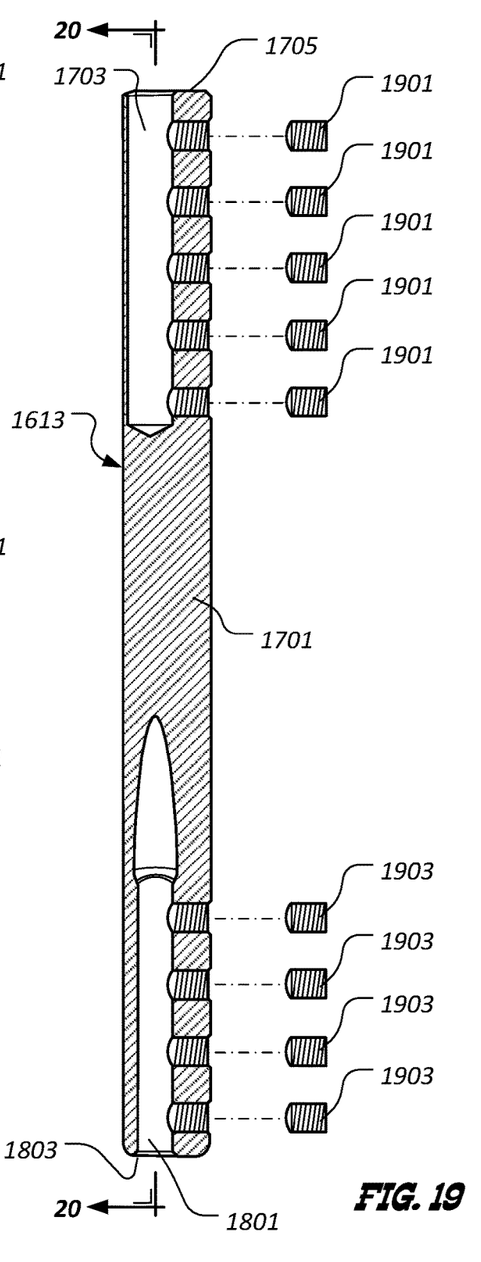
FIG. 19 is a cross-sectional view of the secondary pulling tool of FIG. 16, taken along the line 19-19 in FIG. 17.
Figure 20:
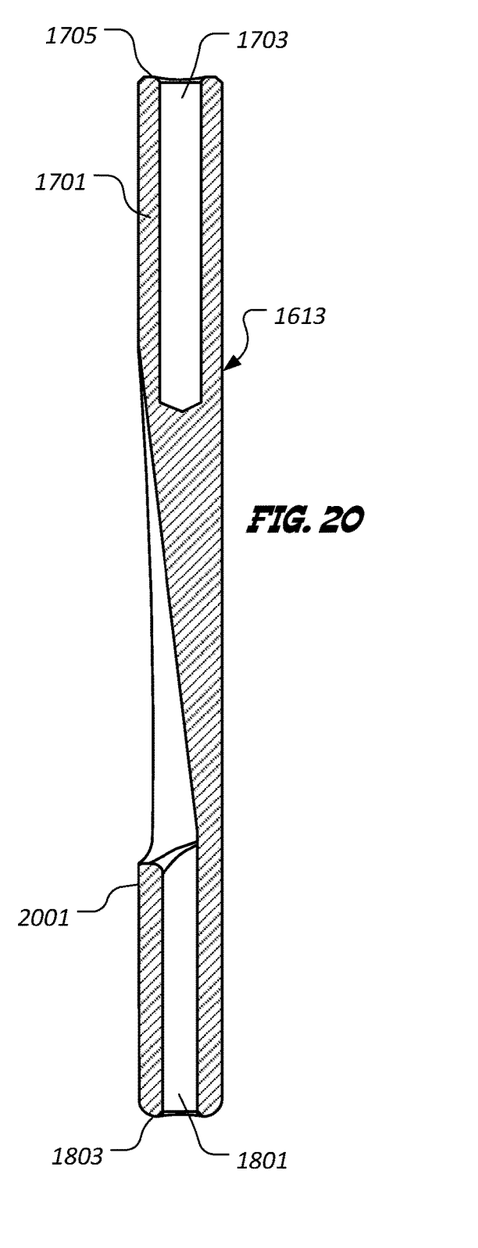
FIG. 20 is a cross-sectional view of the secondary pulling tool of FIG. 16, taken along the line 20-20 in FIG. 19.

FIGS. 17-20 depict an illustrative embodiment of secondary pulling tool 1613. FIG. 17 is an end, elevational view of secondary pulling tool 1613, taken generally in a direction corresponding to arrow FIG. 17 in FIG. 16. FIG. 18 is an end, elevational view of secondary pulling tool 1613, taken generally in a direction corresponding to arrow FIG. 18 in FIG. 16. FIG. 19 is a cross-sectional view of secondary pulling tool 1613, taken along the line 19-19 in FIG. 17. FIG. 20 is a cross-sectional view of secondary pulling tool 1613, taken along the line 20-20 in FIG. 19. Secondary pulling tool 1613 comprises a body 1701 defining a first bore 1703 that extends into and terminates in body 1701 from a first end 1705 thereof. Body 1701 further defines a second bore 1801 that extends into body 1701 from a second end 1803 thereof and terminates at a side surface 2001 of body 1701, extending through side surface 2001. Capillary tube 1615 is received in first bore 1703 and is retained therein by one or more fasteners 1901, which may be in the form of set screws. Second pulling cable 1607 is received in second bore 1801 and is retained therein by one or more fasteners 1903, which may also be in the form of set screws.

Figure 21:
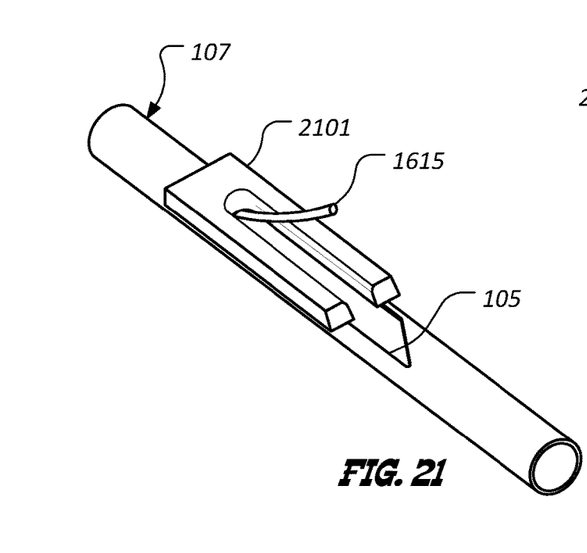
FIG. 21 is a perspective view of portions of the coiled tubing and capillary tube of FIG. 16, illustrating an exemplary use of an illustrative embodiment of a capillary tube guide.
Figure 22:
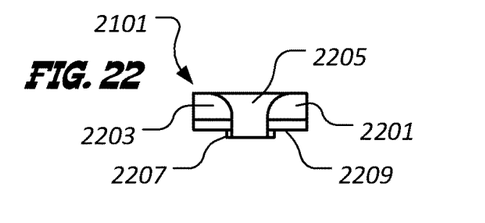
FIG. 22 is an end, elevational view of the capillary tube guide of FIG. 21.
Figure 23:
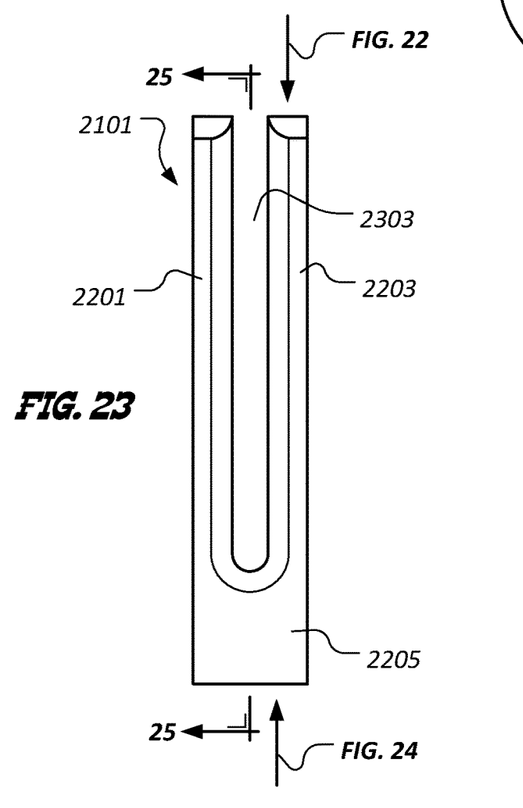
FIG. 23 is a top, plan view of the capillary tube guide of FIG. 21.
Figure 24:
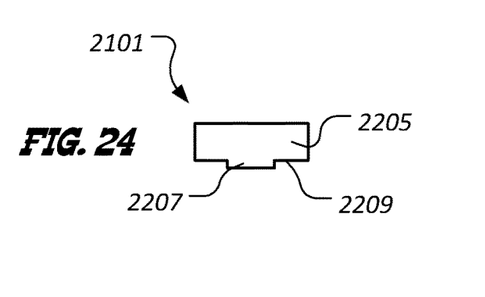
FIG. 24 is an end, elevational view of the capillary tube guide of FIG. 21.
Figure 25:
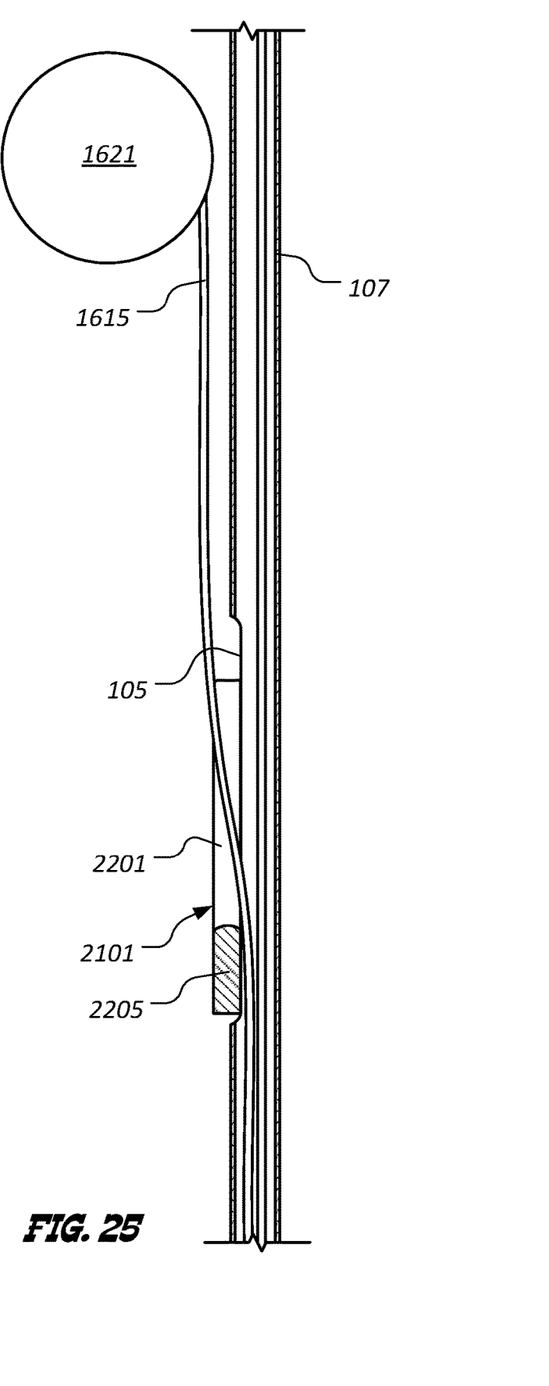
FIG. 25 is a cross-sectional view, corresponding to the view of FIG. 16, illustrating a method for assembling the coiled tubing assembly of FIG. 1 and depicting a device useful in the practice of the invention.

In one embodiment, as depicted in FIG. 21, a capillary tube guide 2101 is disposed on opening 105 of coiled tubing 107 to protect capillary tube 1615 from damage by contact with the edges of opening 105 after secondary pulling tool 1613 is received within coiled tubing 107. FIGS. 22-25 depict various views of an exemplary embodiment of capillary tube guide 2101. FIG. 22 is an end, elevational view of capillary tube guide 2101 taken generally in a direction corresponding to arrow FIG. 22 of FIG. 23. FIG. 23 is a top, plan view of capillary tube guide 2101, while FIG. 24 is an end, elevational view of capillary tube guide 2101 taken generally in a direction corresponding to arrow FIG. 24 of FIG. 23. FIG. 25 depicts a cross-sectional view of capillary tube guide 2101, taken along line 25-25 in FIG. 23, along with a view of coiled tubing 107 corresponding to the view of FIG. 16. Capillary tube guide 2101 comprises a first leg 2201 and a second leg 2203 extending from a base 2205. First leg 2201, second leg 2203, and base 2205 define a slot 2303, through which capillary tube 1615 passes when capillary tube guide 2101 is in use. As best shown in FIGS. 22 and 25, portions of first leg 2201, second leg 2203, and base 2205 that define slot 2303 are rounded, curved, radiused, or the like to inhibit damage to capillary tubing 1615 when capillary tube guide 2101 is in use. In the illustrated embodiment, a protrusion 2207 extends from a lower surface 2209 of capillary tube guide 2101 that interfaces with opening 105 of coiled tubing 107 to position capillary tube guide 2101 properly with respect to coiled tubing 107.

The particular embodiments disclosed above are illustrative only, as the invention may be modified and practiced in different but equivalent manners apparent to those skilled in the art having the benefit of the teachings herein. Therefore, no limitations are intended to the details of construction or design herein shown, other than as described in the claims below.

What is claimed is:

1. A method of making a coiled tubing assembly, comprising:
   providing a coiled tubing defining a side wall opening;
   pulling a capillary tube into an interior of the coiled tubing through the side wall opening;
   attaching the capillary tube to a capillary window of an insert for covering the side wall opening; and
   affixing the insert to the coiled tubing.

2. The method of claim 1, wherein pulling the capillary tube into the interior of the coiled tubing is accomplished by:
   providing a primary pulling tool disposed within the interior of the coiled tubing;
   attaching a secondary pulling cable between the primary pulling tool and a secondary pulling tool;
   attaching the capillary tube to the secondary pulling tool; and
   advancing the primary pulling tool within the interior of the coiled tubing away from the side wall opening.

3. The method of claim 2, wherein the primary pulling tool is affixed to a primary pulling cable for advancing the primary pulling tool within the interior of the coiled tubing.

4. The method of claim 2, wherein attaching the secondary pulling cable between the primary pulling tool and the secondary pulling tool is accomplished by:
   attaching a first end of the secondary pulling cable to the primary pulling tool;
   disposing the secondary pulling cable through a first bore in the secondary pulling tool, the bore extending into a body of the secondary pulling tool between and through a first end of the body and a side surface of the body; and
   advancing one or more fasteners into contact with the secondary pulling cable to retain the secondary pulling cable within the first bore.

5. The method of claim 2, wherein attaching the capillary tube to the secondary pulling tool is accomplished by:
   disposing the capillary tube into a second bore in the secondary pulling tool, the bore extending into a body of the secondary pulling tool from a second end of the body and terminating within the body; and
   advancing one or more fasteners into contact with the capillary tube to retain the capillary tube within the second bore.

6. The method of claim 2, further comprising:
   advancing the primary pulling tool along the interior of the coiled tubing until the secondary pulling cable is adjacent a second side wall opening;
   attaching a second secondary pulling tool to the secondary pulling cable; and
   attaching a second capillary tube to the second secondary pulling tool.

7. The method of claim 1, further comprising disposing a capillary tube guide adjacent the side wall opening prior to pulling the capillary tube into the interior of the coiled tubing, such that the capillary tube contacts the capillary tube guide rather than an edge of the side wall opening as the capillary tube is pulled into the interior of the coiled tubing.

8. The method of claim 7, wherein the capillary tube guide comprises:
   a base;
   a first leg extending from the base;
   a second leg extending from the base, the first leg, the second leg, and the base defining a groove for receiving the capillary tube; and
   a protrusion extending from the first leg, the second leg, and the base configured to be received in the side wall opening.

9. The method of claim 1, wherein the side wall opening and the insert include ends that are non-perpendicular to a longitudinal axis of the coiled tubing.

10. The method of claim 1, wherein the side wall opening and the insert include ends that exhibit angles with respect a longitudinal axis of the coiled tubing within a range of about 15 degrees to about 70 degrees.

* * * * *